United States Patent
Gualco et al.

(10) Patent No.: US 10,253,799 B2
(45) Date of Patent: Apr. 9, 2019

(54) PROCESS FOR INSTALLATION OF ANCHOR DEVICES AND APPARATUS FOR CARRYING OUT SUCH PROCESS

(71) Applicant: Mario Gualco, Erba, CO (IT)

(72) Inventors: Mario Gualco, Erba (IT); Paride Contesini, Milan (IT)

(73) Assignee: Mario Gualco, Erba, Como (IT)

( * ) Notice: Subject to any disclaimer, the term of this patent is extended or adjusted under 35 U.S.C. 154(b) by 289 days.

(21) Appl. No.: 14/908,299

(22) PCT Filed: Jul. 30, 2013

(86) PCT No.: PCT/IT2013/000209
§ 371 (c)(1),
(2) Date: Jan. 28, 2016

(87) PCT Pub. No.: WO2015/015520
PCT Pub. Date: Feb. 5, 2015

(65) Prior Publication Data
US 2016/0195122 A1     Jul. 7, 2016

(51) Int. Cl.
*F16B 13/06* (2006.01)
*F16B 13/08* (2006.01)
(Continued)

(52) U.S. Cl.
CPC .......... *F16B 13/0891* (2013.01); *B25B 31/00* (2013.01); *E01B 9/10* (2013.01);
(Continued)

(58) Field of Classification Search
CPC .. B25B 31/00; F16B 13/0858; F16B 13/0891; F16B 35/02; F16B 13/063;
(Continued)

(56) References Cited

U.S. PATENT DOCUMENTS 681,817 A * 9/1901 Smith .................. F16B 13/066
294/89
777,134 A * 12/1904 Palmer ................. F16B 13/124
411/80.5
(Continued)

FOREIGN PATENT DOCUMENTS

CN        102635616       *   8/2012
EP        1464850 A1          6/2004
(Continued)

OTHER PUBLICATIONS

Japanese Office Action for JP Patent Application No. 2016-530672 dated Mar. 28, 2017 (16 pages).
(Continued)

*Primary Examiner* — Christopher M Koehler
*Assistant Examiner* — Mahdi H Nejad
(74) *Attorney, Agent, or Firm* — Shumaker, Loop & Kendrick, LLP

(57) ABSTRACT

The invention concerns a process for installation of an expansion anchor device, which is used to secure a part to the surface of a structural support member. The anchor device comprises an expandable sleeve (1), mainly extending along a longitudinal axis (X-X) with a proximal end (2) and a distal end (3), which is designed to be placed within a hole formed in the structural member that is designed to have the anchor applied thereto. In the process, once the hole has been formed in the support member and said anchor device has been placed in the hole, a step of orienting the sleeve (1) is carried out, such that the expansion of the latter occurs along the highest-resistance direction of the structural support member. The invention also relates to an apparatus for carrying out the process, which comprises a cylindrical bushing (26) having an axial through hole (27), front coupling means (28) located at the end (29) of the bushing facing the sleeve (1) of the anchor device, said means (28)

(Continued)

being adapted for engagement with front counter-coupling means (30) placed on the proximal end (2) of the sleeve (1) of the anchor device as well as a handle (31) connected to said bushing (26).

6 Claims, 5 Drawing Sheets

(51) Int. Cl.
    *F16B 13/12*     (2006.01)
    *B25B 31/00*     (2006.01)
    *E01B 9/10*     (2006.01)
    *E01B 9/14*     (2006.01)
    *E01B 9/18*     (2006.01)
    *E04B 1/41*     (2006.01)

(52) U.S. Cl.
    CPC .................. *E01B 9/14* (2013.01); *E01B 9/18* (2013.01); *E04B 1/40* (2013.01); *F16B 13/063* (2013.01); *F16B 13/065* (2013.01); *F16B 13/066* (2013.01); *F16B 13/0858* (2013.01); *F16B 13/124* (2013.01)

(58) Field of Classification Search
    CPC .... F16B 13/065; F16B 13/066; F16B 13/124; E04B 1/40; E01B 9/18; E01B 9/14; E01B 9/10; E25B 31/00; Y10T 29/49938; Y10T 29/49948; B23P 11/005
    USPC ........ 411/57.1, 60.1–80.6, 354, 53, 55, 60.2, 411/44, 34, 24, 32; 29/525.11, 525.02
    See application file for complete search history.

(56) References Cited

U.S. PATENT DOCUMENTS

| | | | | |
|---|---|---|---|---|
| 925,006 | A * | 6/1909 | Mason | F16B 13/066 411/25 |
| 1,076,368 | A * | 10/1913 | Hubler | F16B 13/066 411/53 |
| 1,121,980 | A * | 12/1914 | Conrad | F16B 13/066 411/53 |
| 1,302,324 | A * | 4/1919 | Elvin | F16B 13/124 411/68 |
| 1,361,836 | A * | 12/1920 | Devlin | F16B 13/068 411/53 |
| 1,681,817 | A * | 8/1928 | Small | B61D 17/08 105/410 |
| 2,562,419 | A | 7/1951 | Ferris | |
| 5,090,857 | A * | 2/1992 | Dunn | F16B 33/006 411/354 |
| 5,344,252 | A * | 9/1994 | Kakimoto | F16D 1/0888 403/358 |
| 5,634,754 | A * | 6/1997 | Weddendorf | F16B 13/065 411/354 |
| 2003/0017023 | A1* | 1/2003 | Bisping | F16B 13/066 411/60.1 |
| 2003/0017024 | A1* | 1/2003 | Bisping | F16B 13/0825 411/60.1 |
| 2005/0025602 | A1* | 2/2005 | Huang | F16B 13/0858 411/57.1 |
| 2014/0112732 | A1* | 4/2014 | Bushen | F16B 3/06 411/55 |
| 2017/0058932 | A1* | 3/2017 | Cousineau | F16B 13/065 |

FOREIGN PATENT DOCUMENTS

| | | |
|---|---|---|
| FR | 758 624 A | 1/1934 |
| FR | 907 671 A | 3/1946 |
| GB | 540 859 A | 11/1941 |
| JP | S56133112 U | 10/1981 |
| JP | H0231012 A | 2/1990 |

OTHER PUBLICATIONS

International Search Report of corresponding International Application No. PCT/IT2013/000209; 3 pages; dated Apr. 17, 2014.
Indian Examination Report for related IN Application No. 201617006370 dated Feb. 14, 2019, 6 pages. Includes translation. [only new art is cited herein; additional cited art U.S. Pat. No. 2,562,419, French Patent 758624, French Patent 907671, and Great Britain Patent 540859 have been previously cited by the Applicant and considered by the examiner].

\* cited by examiner

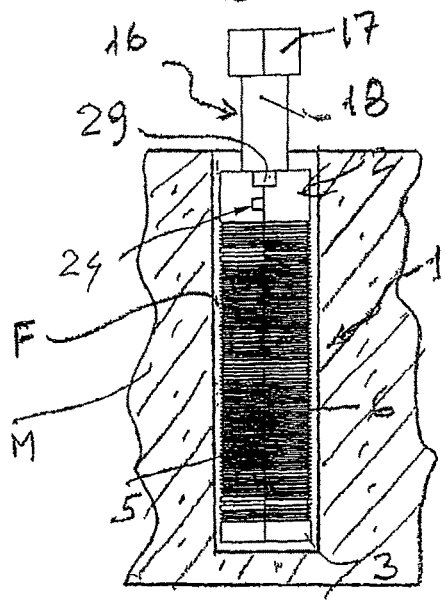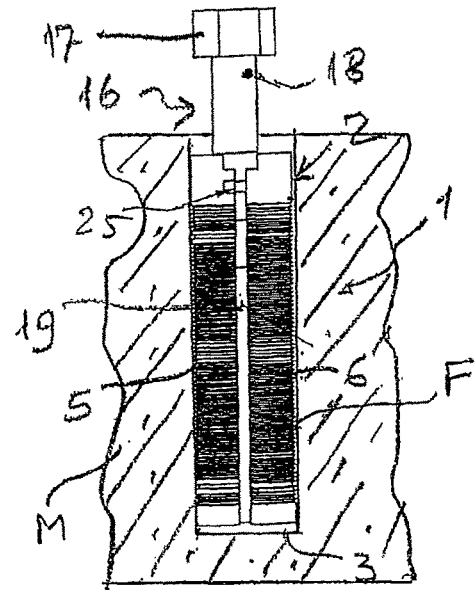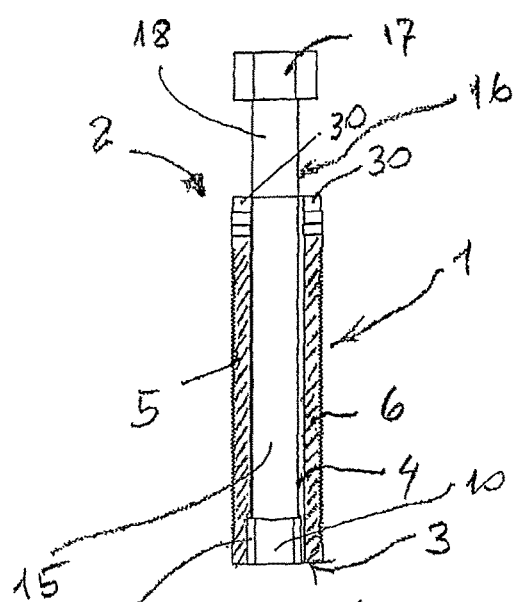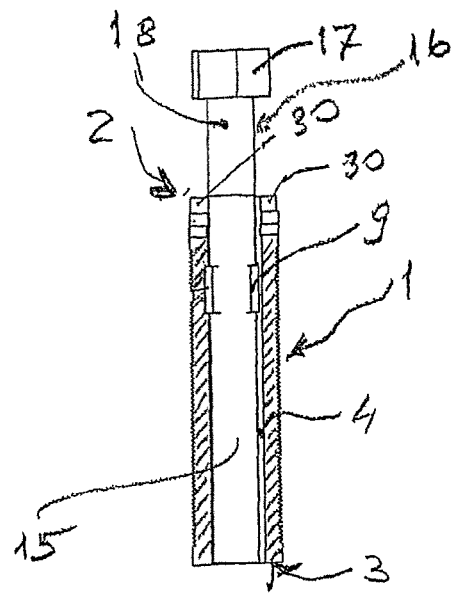

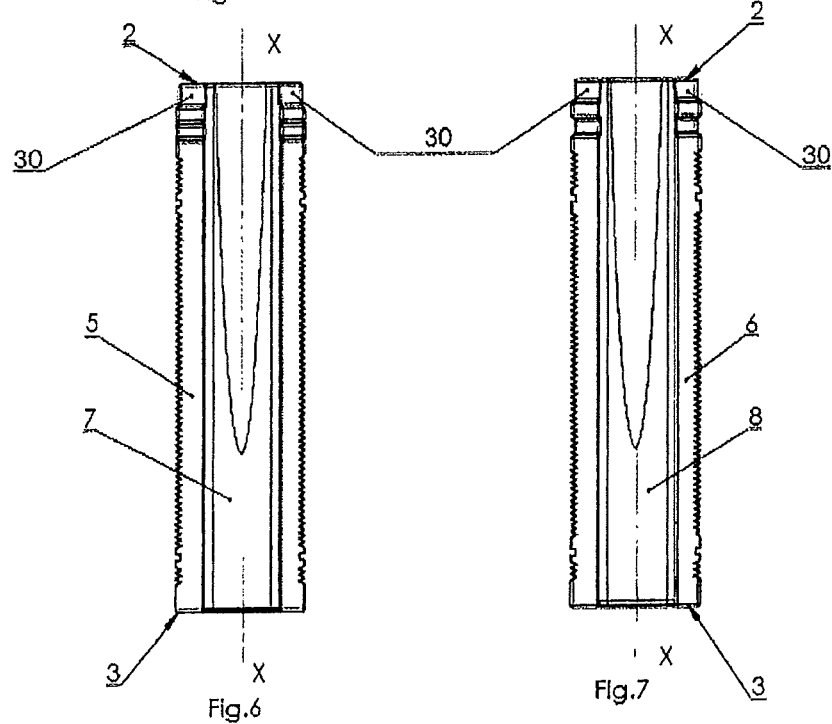

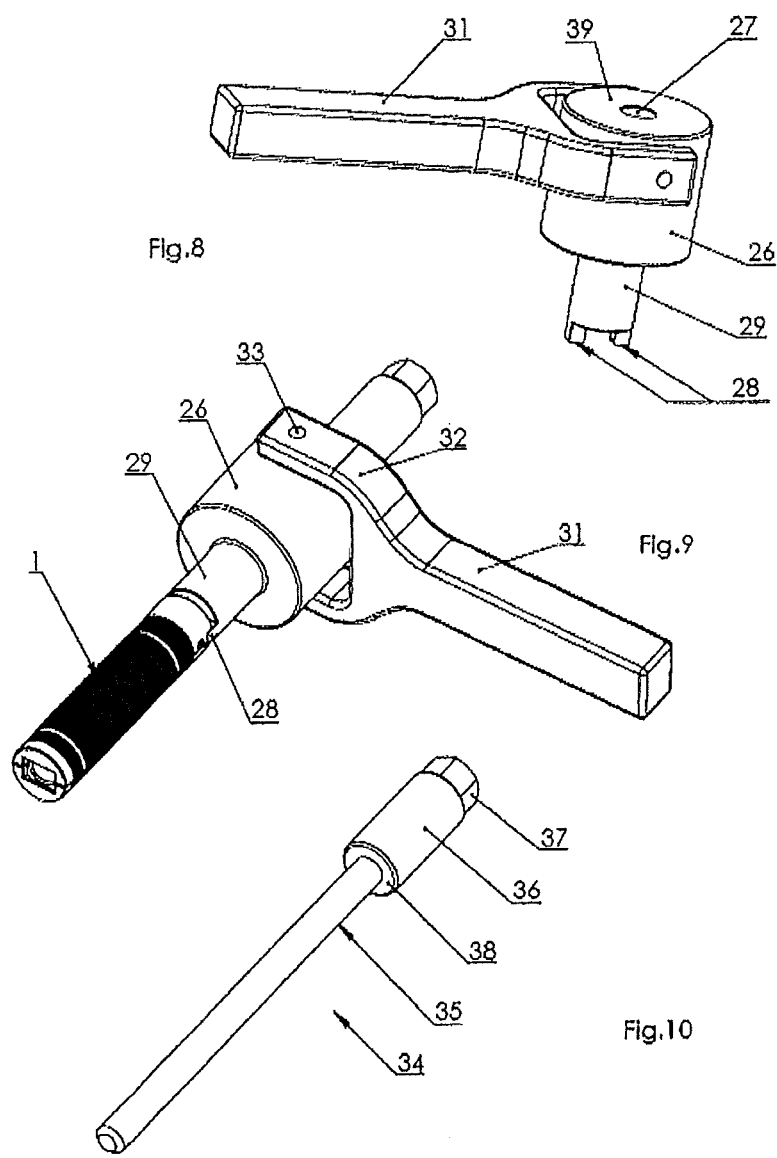

PROCESS FOR INSTALLATION OF ANCHOR DEVICES AND APPARATUS FOR CARRYING OUT SUCH PROCESS

The present invention relates to a process for installation of expansion anchor devices, which are used for securing a part to the surface of a structural support member, as well as an apparatus for carrying out the process.

FIELD OF THE INVENTION

Said anchor devices, known in the art, comprise an expandable sleeve, having a main longitudinal extension with a proximal end and a distal end, which is placed within a hole formed in the structural support member that is designed to have the anchor applied thereto. Such sleeve has an axial cavity formed by frontally coupling at least one pair of concave half-sleeves, said half-sleeves having therein respective flat sliding surfaces for an expansion body.

The sliding surfaces of the half-sleeves converge toward the axis of the cavity, in the direction of the proximal end thereof.

The expansion body that is located within the axial cavity of the sleeve has an internally threaded hole and a contour that allows it to axially slide along the flat sliding surfaces of the cavity of the sleeve, but not to rotate about the axis.

Anchor devices of the above mentioned type are known and widely used, particularly in building and railroad construction.

One example of this anchor device is described in detail in EP 1 464 850-A1.

The installation of the anchor device is known to previously require a hole to be formed in the structural support member in which the expandable sleeve of the anchor device is designed to be placed.

As a result, if the structural support member in which the hole is formed for housing the sleeve of the anchor device has different compression resistance values according to the direction in which compression against the cylindrical vertical wall of the hole is exerted, a random placement of the sleeve of the anchor device within the hole has been found to be susceptible of causing rupture of the structural support member, and hence failure of the anchoring force of the device, if the half-sleeves expand in a lower-resistance direction of the structural support member.

Since such direction involves a lower resistance, cracks and fractures may be formed in the area around the hole, thereby causing the grip of the anchor device to be loosened.

This condition particularly occurs when the structural support member has a shape with a main longitudinal extension and a limited transverse extension such as in the case of a railroad tie for supporting rails.

In the field of railroad construction, these anchor devices are used particularly, but without limitation, to fasten the base plates of the rails to the underlying ties, that may be made of wood or possibly reinforced concrete.

Problem of the Prior Art

The use of anchor devices implies the problem of orienting the sleeve of the device within the hole formed in the structural support member such that the half-sleeves open apart when stressed, and expand in the maximum-resistance direction of the structural member which, in the case of a concrete railroad tie, is the direction parallel to the longitudinal axis of the tie.

The present process of installation of the anchor device helps to obviate the above problem.

The object of the present invention is to reduce the risks of failure that may result from expansion of the sleeve of an anchor device inserted with no positioning control into the hole of the structural member that is designed to support the part to be anchored, which consists for example, particularly in the railroad field, in the base plate of the rail to be supported by the tie.

This object is fulfilled by a process of installation of an expansion anchor device, which is used to secure a part to the surface of a structural support member, said device comprising an expandable sleeve having a main longitudinal extension with a proximal end and a distal end, to be placed within a hole formed in the structural member that is designed to have the anchor applied thereto, said sleeve having an axial cavity defined by front coupling of at least one pair of concave half-sleeves, said half-sleeves having therein respective flat sliding surfaces, the sliding surfaces of the half-sleeves converging toward the axis of the cavity and in the direction of the proximal end thereof, an expansion body placed within the axial cavity of the sleeve, said expansion body having an internally threaded hole and a contour that allows it to be axially displaced along such flat sliding surfaces of the cavity of the sleeve but not to be rotated about the axis, which is characterized in that, once the hole has been formed in the support member and once the sleeve has been placed in the hole, a sleeve orientation step is carried out such that the radial expansion of the sleeve, when caused by the displacement of the expansion body in the cavity of the sleeve, occurs in the highest-resistance direction of the structural support member.

The invention will be now described in greater detail with reference to one exemplary embodiment, given by way of illustration and without limitation, and shown in the annexed drawings, in which:

FIG. 1 shows a lateral view of an anchor device of the present invention, in a closed position, installed in a hole before expansion, with a bolt therein;

FIG. 1A is a longitudinal sectional view of the anchor device in the position of FIG. 1;

FIG. 2 shows a lateral view of the anchor device in a hole, after expansion, with the bolt therein;

FIG. 2A is a longitudinal sectional view of the anchor device in the position of FIG. 2;

FIG. 6 shows an enlarged longitudinal sectional view of the male half-sleeve of the anchor device;

FIG. 6A shows a view of the proximal end of the half-sleeve of FIG. 6;

FIG. 6B shows a view of the distal end of the half-sleeve of FIG. 6;

FIG. 7 shows an enlarged longitudinal sectional view of the female half-sleeve of the anchor device;

FIG. 7A shows a view of the proximal end of the half-sleeve of FIG. 7;

FIG. 7B shows a view of the distal end of the half-sleeve of FIG. 7;

FIG. 8 shows a perspective view of the bushing associated with the handle of the apparatus of the invention for installation of the anchor device as shown in the previous figures;

FIG. 9 shows a perspective view of the apparatus of FIG. 8, applied to the sleeve of an anchor device to be installed;

FIG. 10 shows a perspective view of the preloading bolt of the apparatus of FIG. 9;

DETAILED DESCRIPTION

Referring to the above drawings, the anchor device associated with the installation apparatus of the invention comprises an expandable sleeve, generally referenced 1, having a main longitudinal extension along the axis X-X, with a proximal end 2 and a distal end 3, to be placed in a hole F formed in the structural member, generally referenced M in FIGS. 1 and 2, that is designed to have the anchor applied thereto.

Figure 3:
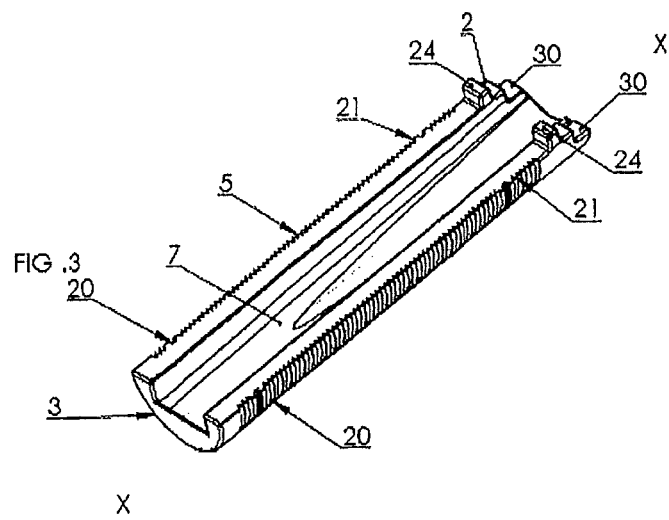
FIG. 3 shows a perspective view of the half-sleeve of the anchor device of FIGS. 1 and 2.
Figure 4:
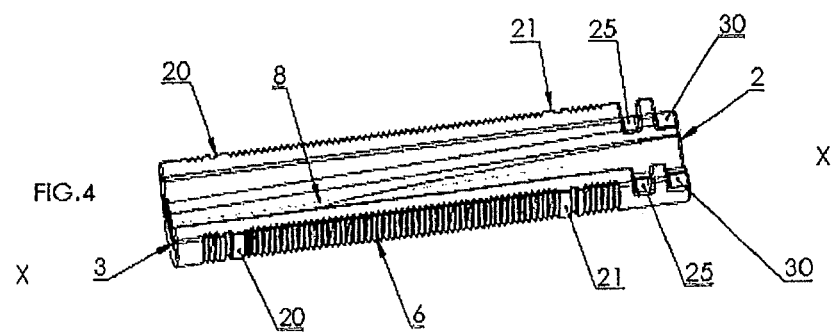
FIG. 4 shows a perspective view of the female half-sleeve of the anchor device of FIGS. 1 and 2.
Figure 5:
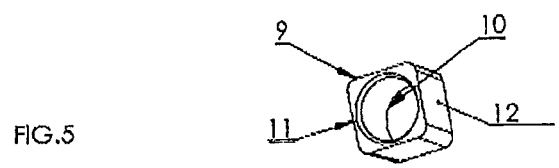
FIG. 5 shows a perspective view of the conical expansion nut of the sleeve of the anchor device of FIGS. 1 and 2.

The sleeve 1 has an axial cavity 4 formed by frontally coupling at least one pair of concave half-sleeves, referenced 5 and 6 respectively. These half-sleeves 5 and 6 have respective flat sliding surfaces 7 and 8 therein (see FIGS. 3 and 4), which converge toward the axis X-X of the cavity 4 in the direction of the proximal end 2 thereof.

The axial cavity 4 of the sleeve 1 houses an expansion body which consists, in the illustrated exemplary embodiment, of a nut 9 with an internally threaded through hole 10.

The contour of the nut 9 comprises at least two opposed flat walls 11 and 12, which converge toward the center of the threaded hole 10, and cooperate with the other two opposed flat walls 13 and 14 to impart a conical shape to the nut.

The pair of opposed walls 11 and 12 allow the nut 9 to be axially displaced along the flat sliding surfaces 7 and 8 of the cavity 4 of the sleeve 1 but not to be rotated about the axis X-X of the cavity.

The threaded hole 10 of the nut 9 is engaged with the threaded shank 15 of a bolt 16 having a head 17 and possibly an unthreaded section 18 directly adjacent to the head 17.

The rotation of the bolt 16 imparted by a conventional tool applied to the head 17, when the anchor device is placed in its seat, causes the nut 9 to be axially displaced in the chamber 4 of the sleeve 1 on the inclined surfaces 7 and 8 and the half-sleeves 5 and 6 to transversely open apart, with respect to the axis X-X, and engage with respective portions of the inner wall of the hole F in which they are housed.

Since the outer surface of the half-sleeves is formed with a high friction, e.g. with a plurality of depressions and radial projections, as the half-sleeves 5 and 6 move away from the axis X-X a pair of radially opposed apertures 19 are formed, and the device is firmly and stably secured in the hole F.

The half-sleeves 5 and 6 are conventionally held against each other by elastic bands, not shown, which are accommodated in respective circumferential grooves 20 and 21 formed on the outer surface of the half-sleeves.

Furthermore, at the distal end 3 of the sleeve 1, i.e. the one that is held in the hole F of the structural support member M, both half-sleeves 5 and 6 have respective radial ribs 22 and 23 projecting toward the axis X-X of the axial cavity 4, which define a shoulder for the nut 9 and prevent it from coming out of the cavity 4 through the distal end 3.

At the proximal end 2 of the cavity 4, the half-sleeve 5 has a pair of teeth 24 for engagement in corresponding notches 25, when the half-sleeves are mounted against each other.

The teeth 24 and the notches 25 form male-female coupling means which exert, once coupled, an action that prevents the half-sleeves 5 and 6 from axially sliding against each other, in the direction of the axis X-X.

Also, since the half-sleeves 5 and 6 are made of a rigid material, e.g. steel, when they move away from each other, they are still parallel to the axis X-X and the amplitude of the opposed apertures 19 is uniform all along its axial extent.

The length of the teeth 24 and the depth of the notches 25 are such as to ensure that the coupling is effective even when expansion is completed and the half-sleeved 5 and 6 have moved away from each other.

As noted from the above, the thrust that locks the anchor device is exerted on the circular wall of the hole F in which the device is accommodated, mainly in the direction in which the half-sleeves 5 and 6 have the freedom of moving away from each other.

According to the invention, the sleeve 1 of the anchor device is installed within the hole F of the structural support member M by orienting the half-sleeves 5 and 6 within the hole F, such that the direction in which they move away from the axis X-X of the cavity 4, as a result of the sliding movement of the nut 9 within the cavity 4, substantially coincides with the direction in which the structural support member M has the highest resistance to the thrusts exerted against the vertical wall of the hole F.

Furthermore, according to the invention, once the half-sleeves 5 and 6 have been oriented within the hole F, their orientation is not lost as the nut 9 is pulled to tension the anchor device, i.e. to finally secure it in its seat.

For this purpose, the process of installation of the anchor device involves the use of an apparatus that comprises a cylindrical bushing 26 having an axial through hole 27, front coupling means 28 placed at the end 29 of the bushing that, in operation, faces toward the sleeve 1 of the anchor device.

The front coupling means, that actually consist of a pair of teeth axially projecting out of the end 29 of the cylindrical bushing 26, are adapted for engagement with corresponding notches 30 formed on the ends of the half-sleeves 5 and 6, which define front counter-coupling means at the proximal end 2 of the sleeve 1 of the anchor device.

Said front coupling means 28 and counter coupling-means 30 are placed on the bushing 26 and the expandable sleeve 1 in such a position as to show the direction in which the sleeve 1 expands, i.e. the half-sleeves 5 and 6 move away from the axis X-X in the hole F.

A lever 31 is connected to the cylindrical bushing, and acts as a handle for the user to support the apparatus as it is engaged with the sleeve 1 when the latter is oriented.

The lever 31 is particularly connected to the bushing 26 by one fork-shaped end 32 and a pivot 33.

The apparatus for installation and orientation of the sleeve 1 of the anchor device is completed by a preloading bolt 34, which comprises a threaded section 35, whose threads are adapted to engage with those of the hole 10 of the expansion nut 9, and a cylindrical section 36 having a predetermined axial extent, and located close to the drive head 37.

The cylindrical section 36 has diametrical dimensions larger than the axial through hole 27 of the bushing 26 such that, as the threaded section 35 has been fully tightened in the nut 9, the upward movement of the latter in the axial cavity 4 is stopped when the end 38 of the cylindrical section 36 abuts the face 39 of the cylindrical bushing 26.

With the above described apparatus, the installation of the anchor device is carried out as follows.

Once the hole F for receiving the anchor device has been formed at the appropriate location in the structural support member M, e.g. a railroad tie, and once the sleeve 1 of the anchor device has been inserted into the hole, the bushing 26 is caused to abut the proximal end 2 of the sleeve 1, with the teeth 28 and the notches 30 of the half-sleeves 5 and 6 being frontally coupled.

As the bushing 26 is held in position by means of the lever 31, angular displacements are imparted to the sleeve 1 until the half-sleeves 5 and 6 are moved to their respective positions, aligned with the maximum-resistance direction of the structural support member M in which the hole F has been formed, such that the half-sleeves 5 and 6 move away from the axis X-X in such direction.

Now, the anchor device is preloaded, to prevent it from losing the orientation assigned to the half-sleeves 5 and 6.

Such preload is obtained using the bolt 34, which is introduced into the through hole 27 of the bushing 29 to engagement of the threaded section 35 in the hole 10 of the expansion nut 9.

The bolt 34 is tightened until the end 38 of its cylindrical section 36 abuts the end 39 of the bushing 26.

Figure 11:
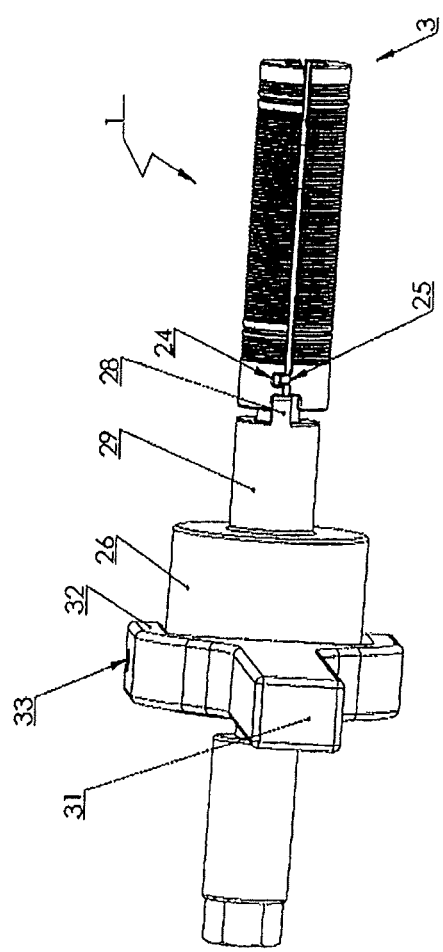
FIG. 11 shows a perspective view of the apparatus of FIG. 8, in operation.

Now, the nut 9, also referring to FIG. 11, has moved in the cavity 4 to a sufficient extent as to cause an initial expansion of the half-sleeves 5 and 6, which adequately adhere to the circular wall of the hole F, thereby preventing any angular displacement of the sleeve 1 during subsequent expansion of the device.

Once the bolt 34 has been loosened and removed from the sleeve 1 and the bushing 26, the expansion of the anchor device is obtained in the conventional manner, by introducing the conventional loading bolt 16 and engaging its threaded section 15 in the hole 10 of the expansion nut 9.

The displacement of the latter in the chamber 4 until full loading is achieved, allows maximum stability of the anchor device to be reached.

The invention as described above is susceptible to construction and dimensional variants without departure from the scope as defined in the following claims.

The invention claimed is:

1. A process of installing an expansion anchor device used to secure a part to a surface of a structural support member, comprising steps of:
   a. providing an expandable sleeve, extending along a longitudinal axis with a proximal end and a distal end, to be placed within a hole formed in the structural support member, the sleeve having an axial cavity defined by front coupling of at least one pair of concave half-sleeves, the half-sleeves each having therein a single respective flat sliding surface converging toward each other in a direction of the proximal end thereof;
   b. providing an expansion body placed within the axial cavity of the sleeve, the expansion body having an internally threaded hole and a contour that allows it to be axially displaced along the flat sliding surfaces of the cavity of the sleeve but not rotated about the longitudinal axis;
   c. placing the expansion anchor device in the hole so that the sleeve is in an oriented position such that the half-sleeves expand apart from each other due to the axial displacement of the expansion body in the cavity of the sleeve, which occurs along a predetermined highest-resistance direction of the structural support member;
   d. causing a preloading expansion of the sleeve to impart a preload to the sleeve and stabilize its oriented position in the hole using a preloading bolt; and
   e. securing the expansion anchor device in the hole of the structural support member by removing the preloading bolt and introducing a conventional loading bolt in its place.

2. The process according to claim 1, wherein the step of causing the preloading expansion of the sleeve is carried out by an installation apparatus including:
   a. a cylindrical bushing having an axial through hole;
   b. a front coupling means located at an end of the bushing facing the sleeve of the expansion anchor device, the front coupling means being adapted for engagement with a front counter-coupling means placed on the proximal end of the sleeve of the expansion anchor device; and
   c. a handle connected to the bushing.

3. The process according to claim 2, wherein the front coupling means and the front counter-coupling means are of the push in fitting type, and are located on the bushing and the expandable sleeve in such a position as to show a direction in which the sleeve expands in the hole.

4. The process according to claim 3, wherein the front coupling means has a pair of teeth axially projecting out of an end of the cylindrical bushing adapted for engagement with corresponding notches of the front counter-coupling means.

5. The process of claim 2, further comprising a step of extending a rod-like member having a drive head through the axial through hole of the bushing and to engage by its threaded section with the internally threaded hole of the expansion body, the expansion body adapted to slide within the expandable sleeve of the expansion anchor device, the rod-like member further having a cylindrical section of a predetermined axial length, arranged proximate to the drive head, the cylindrical section having larger diametrical dimensions than the axial through hole of the bushing.

6. The process of claim 5, wherein the predetermined axial length of the cylindrical section of the rod-like member substantially corresponds to the axial displacement to be imparted to the expansion element in the axial cavity of the sleeve, by tightening therein the threaded section of the rod-like member, to allow stabilization of the sleeve in its oriented position in the hole before final locking of the expansion anchor device.

\* \* \* \* \*